US009479754B2

(12) United States Patent
Tang et al.

(10) Patent No.: US 9,479,754 B2
(45) Date of Patent: Oct. 25, 2016

(54) DEPTH MAP GENERATION

(71) Applicant: Adobe Systems Incorporated, San Jose, CA (US)

(72) Inventors: Huixuan Tang, Toronto (CA); Scott Cohen, Sunnyvale, CA (US); Stephen Schiller, Oakland, CA (US); Brian Price, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/046,021

(22) Filed: Feb. 17, 2016

(65) Prior Publication Data
US 2016/0163053 A1 Jun. 9, 2016
Related U.S. Application Data

(63) Continuation of application No. 14/552,332, filed on Nov. 24, 2014, now Pat. No. 9,292,926.

(51) Int. Cl.
*H04N 5/222* (2006.01)
*H04N 5/232* (2006.01)
(Continued)

(52) U.S. Cl.
CPC ........ *H04N 13/0022* (2013.01); *G06K 9/4661* (2013.01); *G06K 9/6215* (2013.01); *G06T 7/0038* (2013.01); *G06T 7/0042* (2013.01); *G06T 7/0051* (2013.01);
(Continued)

(58) Field of Classification Search
CPC ........... H04N 5/2355; H04N 5/23229; H04N 5/2351; H04N 1/387; H04N 1/3878; H04N 1/4092; H04N 5/23232; H04N 5/33; H04N 9/045; H04N 13/0029; H04N 19/132; H04N 19/46; H04N 19/63; H04N 19/98; H04N 1/39

USPC .................................................. 348/135, 46
See application file for complete search history.

(56) References Cited

U.S. PATENT DOCUMENTS 8,447,141 B2   5/2013   Barenbrug
2007/0019883 A1   1/2007   Wong
(Continued)

OTHER PUBLICATIONS

Search and Examination Report from related GB Application GB1513409.1 dated Dec. 9, 2015, 5 pages.
(Continued)

*Primary Examiner* — Hung Lam
(74) *Attorney, Agent, or Firm* — Kilpatrick Townsend & Stockton LLP

(57) ABSTRACT

Depth maps are generated from two or more of images captured with a conventional digital camera from the same viewpoint using different configuration settings, which may be arbitrarily selected for each image. The configuration settings may include aperture and focus settings and/or other configuration settings capable of introducing blur into an image. The depth of a selected image patch is evaluated over a set of discrete depth hypotheses using a depth likelihood function modeled to analyze corresponding images patches convolved with blur kernels using a flat prior in the frequency domain. In this way, the depth likelihood function may be evaluated without first reconstructing an all-in-focus image. Blur kernels used in the depth likelihood function and are identified from a mapping of depths and configuration settings to the blur kernels. This mapping is determined from calibration data for the digital camera used to capture the two or more images.

20 Claims, 6 Drawing Sheets

(51) Int. Cl.
| | |
|---|---|
| H04N 13/00 | (2006.01) |
| G06T 7/00 | (2006.01) |
| G06T 7/20 | (2006.01) |
| H04N 5/235 | (2006.01) |
| H04N 13/02 | (2006.01) |
| G06K 9/46 | (2006.01) |
| G06K 9/62 | (2006.01) |
| H04N 17/00 | (2006.01) |
| H04N 1/387 | (2006.01) |

(52) U.S. Cl.
CPC .......... *G06T 7/0069* (2013.01); *G06T 7/206* (2013.01); *H04N 5/2226* (2013.01); *H04N 5/2329* (2013.01); *H04N 5/2351* (2013.01); *H04N 5/2355* (2013.01); *H04N 5/23212* (2013.01); *H04N 5/23222* (2013.01); *H04N 13/0271* (2013.01); *H04N 17/002* (2013.01); *G06K 2009/4666* (2013.01); *G06T 2207/10016* (2013.01); *G06T 2207/10028* (2013.01); *G06T 2207/10148* (2013.01); *G06T 2207/20048* (2013.01); *G06T 2207/20144* (2013.01); *H04N 1/387* (2013.01); *H04N 2013/0081* (2013.01); *H04N 2213/003* (2013.01)

(56) References Cited

U.S. PATENT DOCUMENTS

| | | | |
|---|---|---|---|
| 2007/0036427 | A1 | 2/2007 | Nakamura et al. |
| 2008/0075383 | A1 | 3/2008 | Wu |
| 2009/0268985 | A1 | 10/2009 | Wong |
| 2010/0165152 | A1* | 7/2010 | Lim .................. G06T 5/50 348/240.99 |
| 2012/0070097 | A1* | 3/2012 | Adams, Jr. ......... H04N 5/23212 382/255 |
| 2012/0113100 | A1 | 5/2012 | Niioka |
| 2012/0219236 | A1 | 8/2012 | Ali |
| 2012/0229602 | A1 | 9/2012 | Chen |
| 2012/0293499 | A1 | 11/2012 | Lee et al. |
| 2013/0071008 | A1* | 3/2013 | Chen .................. H04N 13/0271 382/154 |
| 2013/0084019 | A1 | 4/2013 | Crandall |
| 2013/0088489 | A1* | 4/2013 | Schmeitz ............. H04N 5/2254 345/419 |
| 2013/0101177 | A1 | 4/2013 | Yamada et al. |
| 2013/0129233 | A1 | 5/2013 | Schiller |
| 2013/0141537 | A1 | 6/2013 | Li |
| 2013/0208093 | A1 | 8/2013 | Sun et al. |
| 2013/0215107 | A1 | 8/2013 | Kimura |
| 2013/0258096 | A1 | 10/2013 | Ali |
| 2013/0259315 | A1 | 10/2013 | Angot |
| 2014/0009574 | A1 | 1/2014 | Hannuksela |
| 2014/0118494 | A1 | 5/2014 | Wu |
| 2014/0132822 | A1 | 5/2014 | Miyagi et al. |
| 2014/0152886 | A1 | 6/2014 | Morgan-Mar |
| 2014/0267243 | A1 | 9/2014 | Ventkataraman |
| 2014/0285623 | A1* | 9/2014 | Bruls .................... G06T 5/002 348/43 |
| 2014/0341292 | A1 | 11/2014 | Schwarz |
| 2015/0002724 | A1 | 1/2015 | Chuang |
| 2015/0109513 | A1* | 4/2015 | Nayar ................ H04N 5/23212 348/349 |
| 2015/0147047 | A1 | 5/2015 | Wang |

OTHER PUBLICATIONS

Search Report and Examination from related GB Application GB1513639.3 dated Jan. 21, 2016, 2 pages.
Search and Examination Report from related GB Application GB1513412.5 dated Dec. 10, 2015, 6 pages.
N. Asada, A. Amano, and M. Baba, Photometric Calibration of Zoom Lens Systems, Pattern Recognition, Proceedings of the 13th International Conference, Aug. 1996, vol. 1, pp. 186-190.
S. Bae and F. Durand, Defocus Magnification, Computer Graphic Forum, 2007, vol. 26, No. 3, 9 Pages.
J. T. Barron and J. Malik, Intrinsic Scene Properties From a Single RGB-D Image, Computer Vision Pattern Recognition (CVPR), 2013, 8 pages.
Y. Boykov, O. Veksler, and R. Zabih, Fast Approximate Energy Minimization Via Graph Cuts, IEEE Transactions Pattern Analysis Machine Intelligence, Nov. 2001, vol. 23, No. 11:Nov. 2001, pp. 1-18.
J. Chen, L. Yuan, C. Keung Tang, and L. Quan, Robust Dual Motion Deblurring, IEEE Conference on Computer Vision and Pattern Recognition (CVPR), 2008, 8 pages.
P. Favaro, Recovering Thin Structures Via Nonlocal-Means Regularization with Application to Depth from Defocus, Computer Vision and Pattern Recognition (CVPR), 2010 IEEE Conference, 8 pages.
P. Favaro, S. Soatto, M. Burger, S. J. Osher, Shape from Defocus Via Diffusion, IEEE Transactions on Pattern Analysis and Machine Intelligence, Mar. 2008, pp. 1-14.
S. Hasino, K. Kutulakos, A Layer-Based Restoration Framework for Variable-Aperture Photography, Computer Vision, IEEE 11th International Conference, 2007, 8 Pages.
S. W. Hasino, K. N. Kutulakos, Confocal Stereo, International Journal of Computer Vision, 2009, vol. 81, Issue 1, 23 Pages.
P. Henry, M. Krainin, E. Herbst, X. Ren, and D. Fox, RGB-D Mapping: Using Kinect-Style Depth Cameras for Dense 3D Modeling of Indoor Environments, International Journal of Robotics Research (IJRR), Apr. 2012, vol. 31, Issue, 17 Pages.
A. Ito, S. Tambe, K. Mitra, A. Sankaranarayanan, and A. Veeraraghavan., Compressive Epsilon Photography for Post-Capture Control in Digital Imaging. ACM TransacationsGraphics, Jul. 12, 2014, vol. 33, Issue 4, Article No. 88, 12 pages.
S. Izadi, D. Kim, O. Hilliges, D. Molyneaux, R. Newcombe, P. Kohli, J. Shotton, S. Hodges, D. Freeman, A. Davison, and A. Fitzgibbon, Kinectfusion: Realtime 3D Reconstruction and Interaction Using a Moving Depth Camera, ACM Symposium on User Interface Software and Technology, 2011, 10 Pages.
Conference on Computer Vision and Pattern Recognition, 2013, 8 Pages.
C. Kolb, D. Mitchell, and P. Hanrahan, A Rrealistic Camera Model for Computer Graphics, 22nd Annual Conference on Computer Graphics and Interactive Techniques, 1995, 8 Pages.
P. Krahenbuhl and V. Koltun, Efficient Inference in Fully Connected CRFs with Gaussian Edge Potentials.117. Curran Associates, Inc., 2011, 9 pages.
M. Levoy, P. Hanrahan, Light Field Rendering, 23rd Annual Conference on Computer Graphics and Interactive Techniques, SIGGRAPH 1996, 12 Pages.
C. Liu, Beyond Pixels: Exploring New Representations and Applications for Motion Analysis, Submitted to Department of electrical Engineering and Computer Science MIT, May 2009, 164 Pages.
S. Nayar and Y. Nakagawa, Shape from Focus, IEEE Transactions on Pattern Analysis and Machine Intelligence, vol. 16, No. 8:, Aug. 1994, pp. 824-831.
W. H. Press, S. A. Teukolsky, W. T. Vetterling, and B. P. Flannery, Numerical Recipes 3rd Edition: The Art of Scientifc Computing, Cambridge University Press, New York, NY, USA, 3 edition, 2007, pp. 76-79, 94, 364, 483, 534, and 981.
X. Ren, L. Bo, and D. Fox, RGB-(D) Scene Labeling: Features and Algorithms, Computer Vision Pattern Recognition (CVPR), 2012, 8 Pages.
S. Song and J. Xiao, Tracking Revisited Using RGBD Camera: Unified Benchmark and Baselines, IEEE International Conference on Computer Vision, ICCV 2013, Sydney, Australia, Dec. 2013, 8 Pages.
R. Tsai, An Efficient and Accurate Camera Calibration Technique for 3D Machine Vision, Computer Vision and Pattern Recognition (CVPR), 1986 IEEE Conference, 12 Pages.
X. Zhu, S. Cohen, S. Schiller, and P. Milanfar, Estimating Spatially Varying Defocus Blur from a Single Image, IEEE Transactions on Image Processing, 2013, pp. 1-13 Pages.

(56) References Cited

OTHER PUBLICATIONS

S. Zhuo and T. Sim, Defocus Map Estimation from a Single Image, Elsevier, Pattern Recognition, Sep. 2011, vol. 44, pp. 1852-1858.
Carlos Hernandez, Research Blog: Lens Blur in the New Google Camper App, http://googleresearch.blogspot.com/2014/04/lens-blur-in-new-google-camera-app.html, Posted Apr. 16, 2014, accesed Jan. 21, 2015, 11 Pages.
Notice of Allowance from related U.S. Appl. No. 14/577,792 dated Dec. 3, 2015, 19 pages.
Notice of Allowance from related U.S. Appl. No. 14/576,936 dated Nov. 24, 2015, 20 pages.
Notice of Allowance from related U.S. Appl. No. 14/552,332 dated Nov. 10, 2015, 20 pages.
Notice of Allowance from Related Application 15/056,283 dated Aug. 10, 2016, 8 pages.

* cited by examiner

DEPTH MAP GENERATION

CROSS-REFERENCE TO RELATED APPLICATION

This application is a continuation application of U.S. patent application Ser. No. 14/552,332 filed on Nov. 24, 2014, now allowed, the contents of which are incorporated herein in their entirety.

TECHNICAL FIELD

This disclosure relates generally to methods and systems for estimating depth within digital images and more particularly relates to estimating depth within digital images captured using a conventional digital camera.

COPYRIGHT NOTIFICATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Digital cameras, including digital single-lens reflex (DSLR) cameras and digital cameras integrated into mobile devices, often have sophisticated hardware and software that enables a user to capture digital images using a combination of different user-defined and camera-defined configuration settings. A digital image provides a digital representation of a particular scene. A digital image may subsequently be processed, by itself or in combination with other images, to derive additional information from the image. For example, one or more images may be processed to estimate the depths of the objects depicted within the scene, i.e., the distance of each object from a location from which the picture was taken. The depth estimates for each object in a scene, or possibly each pixel within an image, are included in a file referred to as a "depth map." Among other things, depth maps may be used to improve existing image editing techniques (e.g., cutting, hole filling, copy to layers of an image, etc.).

Conventional depth estimation techniques involve computational models that rely on "image priors" to guide depth map generation. An "image prior" is a statistical model used to account for certain assumptions about the content or characteristics of a scene and is used to resolve depth ambiguity that may be encountered when analyzing an image. For example, an image prior may be designed based on an assumption that depth varies smoothly across an all-in-focus an image, except where there is depth discontinuity (e.g., at the edge or outline of an object within the scene). In the image domain this type of image prior may be expressed in terms of an expected distribution of gradients across an image. In the Fourier domain, a comparable image prior may be defined such that the amount of energy at a particular frequency is proportional to that frequency raised to some power. The use of this type of image prior in depth estimation may yield good results in some cases, but will fail to do so when depth discontinuities between foreground and background objects are not captured within the image data. Therefore the use of generic image priors in depth map generation leads to imprecise depth estimates given that the underlying assumptions are based on generalizations and necessarily do not hold true for all images (e.g. the actual texture of all scenes will not fit well with the defined image prior).

Some conventional techniques for estimating depth within a digital image also require the input of training data taken from one or more images of different scenes in order to accurately generate a depth map. Some techniques require that the image for which the depth map is to be generated must be captured with a pre-determined aperture setting and a pre-determined focus setting. Other techniques involve a comparison of the characteristics of multiple images taken of the same scene and may require the multiple images to be captured in a particular order or in accordance with pre-defined combinations of aperture, focus and/or other camera configuration settings. Some models also require a dense set of images to be captured in accordance with a predefined combination of aperture, focus and/or other configuration settings or with a randomly selected combination of aperture, focus and/or other configuration settings.

Conventional depth estimation techniques that compare characteristics of multiple images taken of the same scene generally compare image patches with "blur kernels" to estimate the depth of the image patches. A blur kernel is an approximation of out-of-focus blur within an image. Convention models, however, are often biased towards selecting blur kernels with larger blur values, especially in the presence of noise within the image patch (i.e., information that is not accounted for by the model). Selecting blur kernels that do not closely approximate the blur of the image patch will lead to imprecise depth estimates.

Therefore, current depth estimation techniques can be imprecise, resource-intensive, time-consuming, complicated and unpredictable. Accordingly, it is desirable to provide improved solutions for estimating the distance of objects within images taken with conventional digital cameras.

SUMMARY

Systems and methods are provided for generating depth maps from a plurality of images captured using a conventional digital camera. The depth estimation techniques described herein involve a computational model that relies on a flat image prior (also referred to as a "flat prior"). The use of a flat prior, in effect, means that no prior assumption is made about the content or characteristics of the scene. A flat prior is incorporated into the computational model by factoring out or marginalizing the contribution of an all-in-focus image (i.e., what the image would look like if it were entirely in focus), which is included in conventional computational models.

Without prior assumption about what the scene should look like, the depth estimation techniques described herein iteratively compute a depth likelihood for an image patch over a discrete range of depth hypotheses (i.e., possible depths). After all depth hypotheses are evaluated, the depth hypothesis that yields the greatest depth likelihood is selected as the estimated depth of the image patch. Evaluating depth likelihood using a flat prior as described herein provides improved precision because the depth likelihood function relies on what the scene represented in the image data actually looks like, instead of relying on assumptions about what the scene should look like. The iterative evaluation is repeated for all images patches of the image until a complete depth map for the image is generated. In this way, the depth of each image patch is evaluated independently of all other images patches from the same image. As a result, the depth estimate for any given image patch is more precise, as compared to conventional techniques, because it is not influenced by its surrounding image patches.

The depth estimation techniques described herein also involve normalization methods used to account for factors such as noise that could produce biases towards blur kernels with larger blur values. This leads to a more robust method for finding accurate estimates of depth, even in the presence of noise. The depth estimation techniques described herein can also be adapted to account for changes in lighting conditions and scene dynamics. Such techniques provide for generation of more precise depth estimates in depth maps.

The depth estimation techniques described herein rely on calibration data for the digital camera used to capture the images. The calibration data is used to determine a mapping of calibration settings (e.g., aperture settings, and focus settings) to blur kernels. Blur kernels represent an approximation of blur in an image. In particular, the depth estimation techniques described herein iteratively evaluate the depth of an image patch over a discrete set of depth hypotheses using corresponding blur kernels identified from the calibration-based mapping.

The depth estimation techniques described herein are used to analyze sets of images captured from the same viewpoint using different camera configuration settings, such as an aperture setting and a focus setting, which may be arbitrarily selected by the operator. Thus, the process of capturing the images is unrestrained, in that no pattern or combination of images or camera configurations settings is required. A minimum of two such images are processed according to the depth estimation techniques described herein to produce a depth map with greater precision than afforded by conventional techniques.

These illustrative examples are mentioned not to limit or define the disclosure, but to provide examples to aid understanding thereof. Additional examples are discussed in the Detailed Description, and further description is provided there.

BRIEF DESCRIPTION OF THE FIGURES

These and other features described above, examples, and advantages of the present disclosure are better understood when the following Detailed Description is read with reference to the accompanying drawings, where.

DETAILED DESCRIPTION

Figure 1:
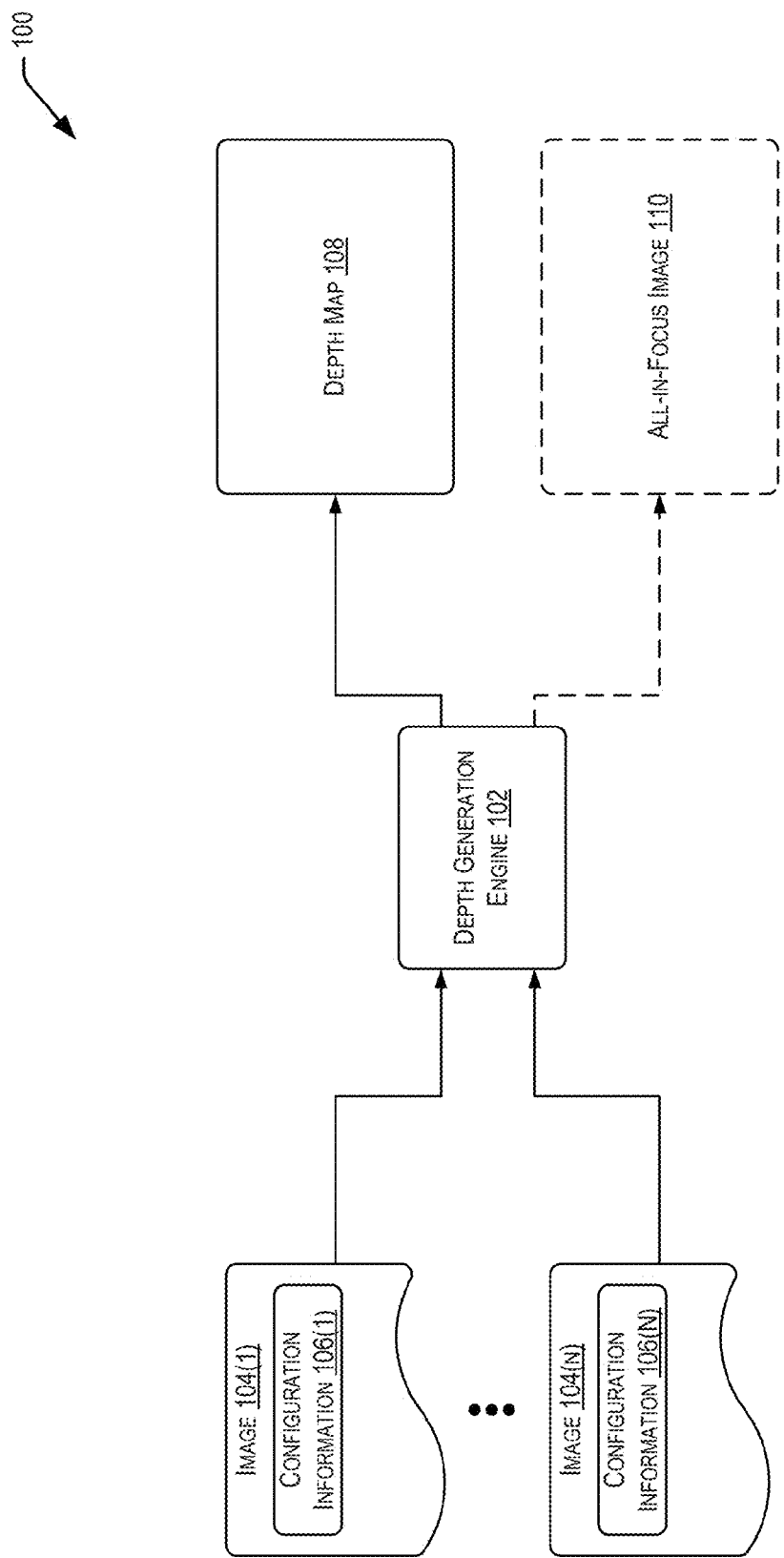
FIG. 1 is a block diagram depicting an example of a depth generation engine for implementing techniques relating to estimating depth within digital images according to at least one embodiment.

Computer-implemented systems and methods are disclosed for estimating depth within digital images. In particular, a depth map is generated from a plurality of images captured with a conventional digital camera, such as a DSLR camera, a digital camera integrated into a mobile computing device, or any other digital camera or imaging device. A minimum of two images are taken from substantially the same viewpoint, but differ because each is taken with a different combination of aperture settings and focus settings. In some examples, the different aperture settings and focus settings may be arbitrarily selected by the operator, as will be discussed. The differences in the level of blur across the images caused by the different combination of aperture and focus settings are analyzed in order to determine the depth map.

The inventive depth estimation techniques include a depth likelihood function that is used to analyze image patch depth using blur kernels. The blur kernels for a particular image are identified from a mapping of calibration settings (e.g., aperture and focus) and depth to blur kernels. The mapping is derived from a calibration of the particular camera used to capture the image to be analyzed. The blur kernels are an approximation of blur within the image. The depth likelihood function uses blur kernels to analyze corresponding image patches from the set of input images using a flat prior in the frequency domain, which means that the contribution of an all-in-focus image is effectively factored out by assuming a frequency content variance of infinity. This likelihood function thus allows the depths of image patches to be estimated without considering an all-in-focus image, without relying on certain assumptions about other similar scenes derived from training data, and without considering how the depth of the scene varies spatially.

For a given image patch, the depth likelihood function is iteratively evaluated over a discrete range of depth hypotheses (i.e., possible depths) to determine a depth likelihood for the image patch. As used herein, "iteratively" evaluating refers to sequentially evaluating and/or evaluating in parallel. The depth hypothesis that yields the greatest depth likelihood is determined to be the estimated depth for the image patch. In evaluating each image patch of a first image, a corresponding image patch of a second image is identified. As part of the evaluation, the blur kernel for the first image is convolved with the image patch from the second image and the blur kernel for the second image is convolved with a corresponding image patch from the first image. The result of the evaluation is a depth likelihood from the image patch. The depth likelihood function is used to evaluate all corresponding image patches within the input images until a depth estimate is determined for each corresponding pixel of each image. Because the depth likelihood function is used to evaluate depth hypotheses for each image patch independent of other image patches, the depth estimate for an image patch in question is not influenced by its surrounding image patches.

The depth estimation techniques described herein include a normalization step that is used to account for factors that could produce biases towards blur kernels with large blur values. One pervasive factor is noise and the influence of noise on blur kernel selection is reduced through normalization. This enables the depth likelihood function to be evaluated using blur kernels with depth values most appropriate for the depth hypotheses for a particular patch. This leads to a more robust method for finding accurate estimates of depth, even in the presence of noise.

The depth estimation techniques described herein can also be adapted to account for changes in lighting conditions and changes in scene dynamics across multiple corresponding images. These changes can be accounted for by adjusting the bias and gain of a second image patch compared to a first image patch. This may be accomplished by modeling changes in lighting conditions as a local contrast change and brightness offset for the changed image patch. The depth likelihood function may then be adjusted to incorporate such modeling changes in lighting conditions. Similarly, motion of objects within a scene can be accounted for using an optical flow technique to estimate a new location of pixels in a second image compared to a location of the corresponding pixels in a first image. Such techniques also include transforming image patches to the Fourier domain by representing them as a set of frequencies and phases and comparing the magnitudes of all image patches, while ignoring the phases. Such techniques provide for generation of more precise depth estimates in depth maps. In some examples, both an optical flow technique and a technique in the Fourier domain may be used in conjunction to account for motion of objects within a scene. The optical flow technique may be performed prior to evaluating the depth likelihood function and the technique in the Fourier domain may be performed as part of evaluating the depth likelihood function.

In one example, a first image of a scene is taken with a digital camera having a first configuration setting. The configuration setting includes a focus setting and an aperture setting. Next, a second image of the scene is taken from the same viewpoint with the digital camera having a second configuration setting. The second configuration setting differs in at least one respect (e.g., the focus setting and/or the aperture setting) as compared to the first configuration setting. In some examples, the user selects the configuration settings arbitrarily, randomly or systematically. In other examples, the digital camera is configured to display to the user preferred or suggested configuration settings, which may be predetermined (e.g., for all scenes or for particular types of scenes) or may be determined in real-time by analyzing the scene to be imaged. In some examples, the digital camera is configured to arbitrarily, randomly or systematically determine or predetermine the configuration settings for the first image and the second image and may also programmatically take the first image, change the configuration settings, and then take the second image. In some examples, the user is provided with the configuration settings, adjusts the settings of the digital camera in accordance with the configuration settings, and captures the first image and the second image. The second image is taken from roughly the same viewpoint as the first image. The image files corresponding to first and second images are then analyzed in accordance with techniques described herein. This analysis may be performed by an appropriately equipped and configured camera or the images files may be transferred to a computing device configured to perform the analysis.

A depth map generated using the depth estimation techniques described herein includes depth information representing the distance of objects in a scene from the digital camera (i.e., a location in the real-world from where the pictures were taken). Distance values for pixels of the depth map may correspond to RGB pixels of the images. Depth maps may be used, for example, to improve existing image editing techniques. For example, depth information for an image may be used to distinguish more accurately between foreground objects and background objects in a scene. Such a distinction may be relevant to selecting objects (whether in the foreground or background) within the image. By way of illustration, an image of a scene may depict a child (e.g., a foreground element) standing in front of a tree (e.g., a background element). A user desiring to "clip" the child from the scene may indicate as such by selecting a portion of the child using an image editing application. The image editing application may use depth information associated with the image, in addition to selection cues such as color and texture, to generate an outline of the child to be clipped.

Turning now to the figures, FIG. 1 illustrates block diagram 100 for implementing techniques relating to estimating depth within digital images according to at least one example. The block diagram 100 includes depth generation engine 102. As used herein, "engine" refers to a set of instructions embodied in software that, when executed on a processor, cause the processor to perform one or more functions. In particular, the depth generation engine 102 is configured to evaluate the depth likelihood function, along with any variations to the depth likelihood function described herein. The depth generation engine 102 is configured to receive images 104(1)-104(N). In some examples, the images 104(1)-104(N) have been previously captured using a digital camera. The images 104(1)-104(N) depict a scene including a plurality of objects. As illustrated, each of the images 104(1)-104(N) include corresponding configuration information 106(1)-106(N). In some examples, the configuration information 106(1)-106(N) provides details about settings of the digital camera used to capture the images 104(1)-104(N) and is stored in the form of metadata in association with the images 104(1)-104(N). For example, the configuration information 106(1)-106(N) may include details about aperture settings of the digital camera and details about focus settings of the digital camera. The aperture settings relate to the amount of light let into the digital camera when the images 104(1)-104(N) were captured. The aperture of a digital camera can be adjusted using a mechanism of blades that adjusts the amount of light. The focus settings relate to a distance of a focal plane from the digital camera and may be adjusted accordingly.

In some examples, the configuration information 106(1) for the image 104(1) differs from the configuration information 106(N) for the image 104(N) because the image 104(1) was captured using a first setting configuration and the image 104(N) was captured using a second setting configuration. How the first setting configuration and the second setting configuration are selected depends on the implementation of the depth generation engine 102. For example, when the depth generation engine 102 is implemented in the digital camera, the digital camera programmatically determines and changes the settings or displays preferred or suggested settings for the user to change manually. When the depth generation engine 102 is implemented in a computing device separate from the digital camera, the computing device displays or causes the settings to be displayed to the user of the digital camera. The user of the camera then adjusts the settings of the camera accordingly. In either example and in other examples, the settings are selected arbitrarily, randomly, or systematically, either by the user or programmatically with the assistance of a selection engine (not shown), or in any other suitable manner. In some examples, the images 104(1)-104(N) are captured using a random set of configuration settings. For example, the images 104(1)-104(N) may also be captured using a random set of configuration settings when the images 104(1)-104(N) are captured without regard to a focal stack. For example, a focal stack is a set of images taken with one focus setting and different aperture settings for each image of the set. The images 104(1)-104(N) may also be captured without regard to an aperture stack. An aperture stack is a set of images taken with one aperture setting and a different focus setting for each image of the set. In some examples, the images 104(1)-104(N) are captured without regard to a pre-determined sampling pattern. As discussed in the examples above, the depth estimation techniques described herein are implemented using two or more images in a manner irrespective of configuration settings of the digital camera used to capture the images, so long as at least two different images are captured from substantially the same viewpoint using two different configuration settings.

In some examples, a camera body and lens of the digital camera that was used to capture the images 104(1)-104(N) have been previously calibrated. Certain calibration techniques involve a mapping of configuration settings (e.g., aperture settings and focus settings) and depth to blur kernels. Such calibration techniques enable the depth generation engine 102 to select the appropriate blur kernels for making depth estimates using the images 104(1)-104(N). In some examples, at least some of the images 104(1)-104(N) are captured from substantially the same viewpoint using different combinations of camera bodies and lens of different digital cameras having been similarly calibrated. Thus, in some examples, the mapping of configuration settings and depth to blur kernels is unique to a combination of a camera body and lens and to multiple combinations of camera bodies and lenses. In this example, the depth generation engine 102 accounts for the similarities and differences in these mappings while making depth estimates.

Continuing with the discussion of block diagram 100, after the depth generation engine 102 receives the images 104(1)-104(N), the depth generation engine 102 performs the techniques described herein to generate depth map 108. The depth generation engine 102 may also compute an all-in-focus image 110 and determine a measure of uncertainty (not shown). The measure of uncertainty indicates how much variance there is in the depth likelihood for given depths. The all-in-focus image 110 represents a recreation of the scene depicted by the images 104(1)-104(N), but without any blur. Computation of the all-in-focus image 110 and the measure of uncertainty is optional to implementing the techniques described herein. In some examples, the all-in-focus image 110 is used by other engines (not shown) to refine or otherwise improve upon existing depth maps. In some examples, image patches of the images 104(1)-104(N) and blur kernels are compared by the depth generation engine 102 as part of generating the depth map 108. As used herein, an "image patch" refers to a small area of an image (e.g., the images 104(1)-104(N)) that includes a plurality of pixels. As used herein, a "blur kernel" is a model of out-of-focus blur in the image acquisition process. The blur kernel may be represented by a disc of a certain radius, a polygon, a Gaussian, a square, or any other suitable feature that models out-of-focus blur during the image acquisition process. The blur kernels comprise assumptions regarding the amount of blur in the images 104(1)-104(N) for particular depths, given a particular aperture setting and a particular focus setting. In some examples, the depth estimation techniques consider other configuration settings that could affect blur in an image when generating the blur kernels (in addition to or in place of aperture and focus settings).

The depth generation engine 102 performs one or more operations in accordance with the techniques described herein to evaluate the depth likelihood function and output the depth map 108. These one or more operations include comparing, for a position in the images, an image patch 1 from the image 104(1) convolved with some blur kernel 2 from a corresponding location in the image 104(2) with an image patch 2 from the image 104(2) convolved with some blur kernel 1 from a corresponding location in the image 104(1). As used herein, "convolving" is a type of blurring that occurs when an image patch is blurred by a blur kernel using techniques described herein. The blur kernels 1, 2 (as described herein) represent assumptions regarding the amount of blur that should be expected at their corresponding locations within the images 104(1), 104(2) using particular configuration settings. The comparison suggested above may be performed for a discrete set of depth hypothesis for the position and then patch-by-patch until the entirety of the images 104(1), 104(2) has been analyzed. In some examples, at least a portion of this comparison is normalized to avoid bias towards blur kernels with larger blur levels that are present in the images 104(1), 104(2). In some examples, normalization relates to situations where there is noise present in the images 104(1), 104(2). This may be because blur kernels with larger blur values smooth out noise and decrease its influence. This influence of noise is most prevalent when the images 104(1), 104(2) are very noisy, but only slightly out-of-focus. Thus, the techniques described herein account for the influence of noise by normalizing a portion of the depth likelihood function discussed above. For example, normalizing a portion of the depth likelihood function may include adjusting the convolution equation (1), $\|f2*i1-f1*i2\|$, to resulting convolution equation (1') $\|f2*i1-f1*i2\|/\sqrt{(\|f1\|^2+\|f2\|^2)}$, where $\|f\|^2 = \text{sum\_q } (f(q))^2$, In this example, i1 is an image patch in image I1 that has been blurred with out-of-focus kernel k1. Similarly for i2 and k2. Evaluation of (1) is to discover that f1=k1 and f2=k2. Indeed when there is no noise, i1=k1*h and i2=k2*h, where h is the all-in-focus image 110, * is convolution, and f1=k1, f2=k2 minimizes (1) with minimize value of 0:
k2*i1−k1*i2=k2*(k1*h)−k1*(k2*h)=(k2*k1−k1*k2)*h=0 because k2*k1=k1*k2.

However, when there is noise the first and second images:
i1=k1*h+n1 (all evaluated at pixel p)
i2=k2*h+n2 (all evaluated at pixel p)
with zero-mean normal noise (variance=s^2)
n1~0 N(0, s^2)
n2~N(0, s^2)

Then equation (2) f2*i1−f1*i2=[(f2*k1−f1*k2)*h]+(f2*n1−f1*n2) The first term can be minimized with f1=k1, f2=k2, but there is still a second term to account for. The first term is zero when (f1,f2)=(k1,k2). Suppose (f1,f2)=(ff1,ff2) is not the correct pair of blur kernels (k1,k2), but gives a small value for the first term in brackets. Taking the norm of the sum of the two terms in equation (2), may provider a smaller value for (ff1,ff2) than (k1,k2). In some examples, this is not a suitable selection for (k1,k2). In some examples, larger blurs in the first and second images will smooth out the noise and decrease the influence of noise as the differences in equation (2) will become smaller. The convolutions f2*n1, f1*n2 add up independent normal variables n1(q), n2(q) at pixels q with weights given by the kernel taps/weights f1(q), f2(q). Thus, f2*n1~0 N(0, s^2 sum_q(f2(q))^2) (really f2*n1 evaluated at pixel p)
f1*n2~N(0, s^2 sum_q(f1(q))^2) (really f1*n2 evaluated at pixel p)
f2*n1−f1*n2~N(0, s^2 (sum_q(f1(q))^2+sum_q(f2(q))^2)) (really f2*n1−f1*n2 evaluated at pixel p)

That is, the variance is multiplied by the sum of the squares of the filter taps. When the blur has radius R, the non-zero kernel weights are all 1/(pi*R^2) [which is 1 over the area of a circle with radius R]. Thus a circular filter f with radius R has $$\text{sum\_q } (f(q))^\wedge 2 = \text{sum\_}\{q \text{ in circle with radius } R\}(1/pi*R^\wedge 2)^\wedge 2$$
$$= (1/pi*R^\wedge 2)^\wedge 2 * \text{sum\_}\{q \text{ in circle with radius } R\}$$
$$= (1/pi*R^\wedge 2)^\wedge 2 * pi*R^\wedge 2$$
$$= 1/pi*R^\wedge 2$$

This means that the variance s^2 (sum_q(f1(q))^2+sum_q (f2(q))^2) of the second term f2*n1−f1*n2 of equation (2) is smaller when f1 and f2 are larger blurs. If two small blurs are the correct answer, but two larger blurs also give a relatively small first term, then noise may cause some methods to incorrectly choose larger kernel sizes. And larger blurs (f1,f2) also reduce differences in the first term of equation (2).

Therefore the techniques described herein normalize convolution equation (1) from above to account for the levels of out of focus blur kernels by resulting convolution equation (1') ||f2*i1−f1*i2||/sqrt(||f1||^2+||f2||^2), where ||f||^2=sum_q(f (q))^2.

Convolution (e.g., image patch 1 convolved with blur kernel 2) may include taking a weighted average of pixels surrounding a particular pixel. In some examples, the resulting blurred patches are determined as convolution operators (using the blur kernels) and are applied over images patches of the all-in-focus image 110. The size of the blur kernels depends on an object's distance from a lens and configuration settings of a camera used to capture the images 104(1), 104(2).

In some examples, the depth map 108 is an image file including color information and depth information. The depth map 108 may also be a specialized image file that includes depth information. The depth information may represent an estimation of the distance of objects within the scene from the digital camera when the images were captured. In some examples, generating the depth map 108 includes evaluating a depth likelihood function over a discrete set of depth hypotheses for image patches appearing in the images 104(1)-104(N) taken with different configuration settings (e.g., aperture and focus settings). A depth hypothesis is an estimate of a depth for a patch, a pixel, or the like. From the discrete set of depth hypotheses, individual depth estimates for each pixel are determined at least in part by evaluating each image patch over the discrete set of depth hypotheses using the depth likelihood function. The depth estimate achieving maximal likelihood is selected as the correct depth estimate. In this manner, the depth map 108 is generated with a certain degree of confidence. In some examples, generating the depth map 108 includes tuning with respect to blurry image patches and blur kernels.

In some examples, the techniques relating to estimating depth as described herein are implemented iteratively for each possible depth at each position in a scene captured by two or more images. For example, to estimate a depth associated with a particular position, L, within two images, I1 and I2, images patches from each of the two images are evaluated over a discrete set of depth hypotheses using a depth likelihood function and a depth hypothesis from the set with a maximal likelihood is selected. The depth hypothesis with the maximal likelihood represents a depth estimate that is most likely for the particular position, L, in the two images, I1 and I2, being evaluated. Thus, a first depth hypothesis comprises a first depth hypothesis, DH1, and is used to select a first blur kernel, K1, for image patch, P1 (image patch from I1, centered at L), and a second blur kernel, K2, for image patch P2 (image patch from I2, centered at L). Evaluating the depth likelihood as described herein comprises convolving P1 with K2 and convolving P2 with K1 to determine the depth likelihood for DHI (i.e., the likelihood that DH1 is the correct approximation of the real-world depth). Once the depth likelihood for H1 is calculated, the evaluation of P1 and P2 continues over the remaining depth hypotheses DH2-DHn (e.g., forty discrete depths may be selected) using the depth likelihood function until each hypothesis in the set of depth hypotheses has been evaluated. The depth hypothesis with the maximal likelihood (e.g., the most likely depth) is then selected from the set of depth hypotheses, including corresponding likelihoods, as the most likely approximation of the real-world depth for the particular position L. In some examples, a similar process is repeated for every position (e.g., pixel-by-pixel, patch-by-patch, etc.) within the two corresponding images. In this manner, the techniques relating to estimating depth described herein are not only iterative for each depth hypothesis at a particular position, but are also iterative for each position within the scene.

Figure 2:
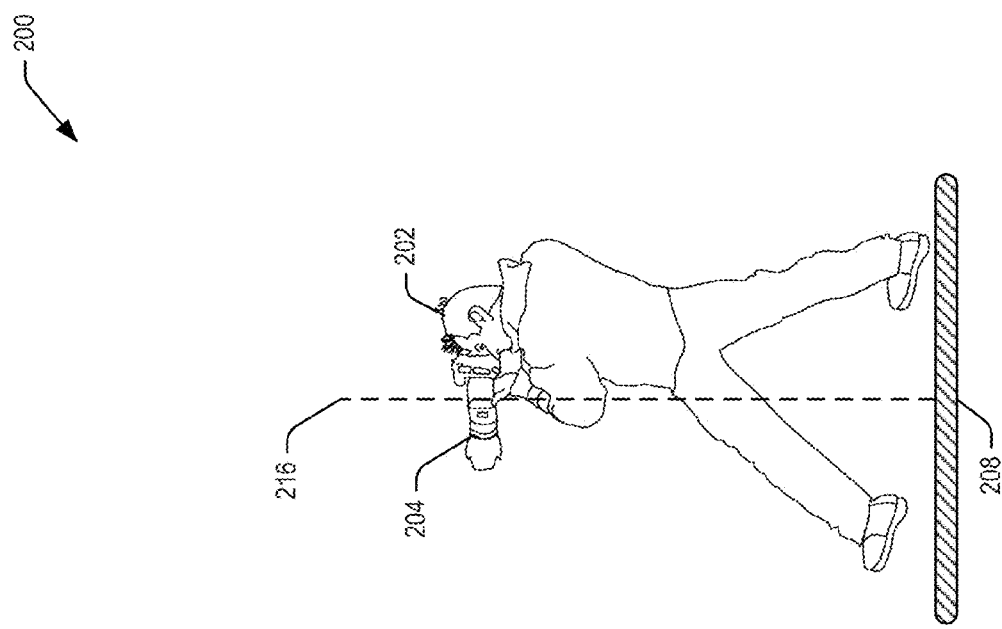
FIG. 2 is a diagram depicting an example environment for implementing techniques relating to estimating depth within digital images according to at least one embodiment.
Figure 2:
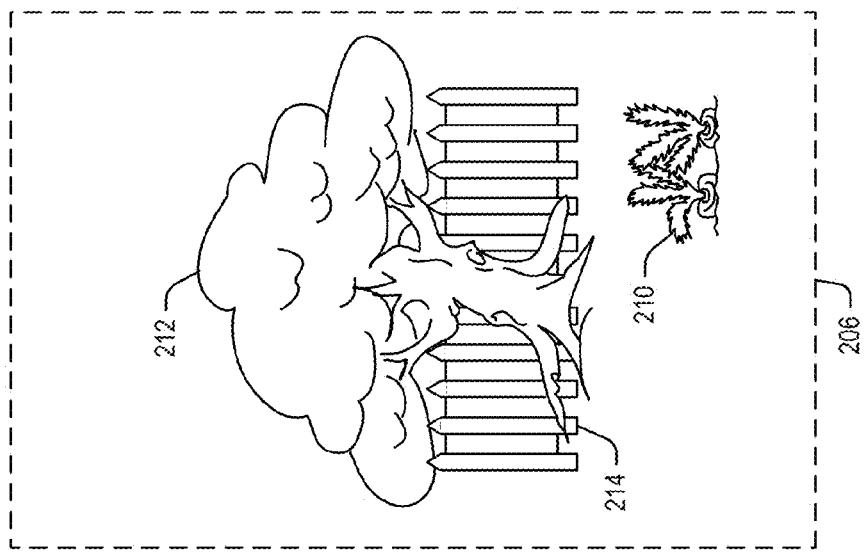

FIG. 2 illustrates an example environment 200 for implementing techniques relating to estimating depth within digital images as described herein. The environment 200 includes an operator 202 utilizing a digital camera 204 to capture an image of scene 206. The operator 202 is optional to implementing the techniques described herein. In some examples, the digital camera 204 may be mounted on a tripod or other suitable device and the images of the scene 206 may be captured programmatically with little or no assistance from the operator 202. The digital camera 204 is situated at a viewpoint 208 while used to capture the image of the scene 206. The scene 206 includes a plurality of objects 210-214. In particular, three objects of the scene 206 are illustrated in environment 200, which are carrots 210, a tree 212, and a fence 214. As illustrated, the carrots 210 appear more in the foreground of the scene 206, while the tree 212 and the fence 214 appear more in the background. Regardless of where the objects 210-212 appear in the scene, each is defined as having a distance from the viewpoint 208. In some examples, the distance of each object within the scene 206 is measured from line 216 that intersects a lens of the digital camera 204. In some examples, the distance of each object within the scene 206 may be approximately determined using depth estimation techniques.

In some examples, the operator 202 arbitrarily selects or systematically changes configuration settings of the digital camera 204 for capturing images of the scene 206. The configuration settings include aperture settings, focus settings, and any other setting that affect the level of blur in an image at different depts. For example, while capturing a first image, the operator 202 first selects an aperture setting of f/1.2 (selected out of, for example, f/1.2, f/2, f/4, f/5.6, f/8, f/16, f/22 or other suitable aperture settings) on the digital camera 204. The operator 202 then focuses the digital camera 204 on the carrots 210 and captures the scene 206 using the digital camera 204. While capturing a second image, the operator 202 selects a different aperture setting (e.g., f/4) or may retain the same aperture setting (i.e., f/1.2) while focusing the digital camera 202 on an object (e.g., the tree 212) other than the carrots 210. While capturing a third image, the operator 202 goes through the same steps as performed to capture the first and second images, but varies the configuration settings of the digital camera 204 as compared to those used when capturing the first and second images. In this manner, the operator 202 captures images of the scene 206 with different aperture settings and/or different focus settings. In accordance with technique described herein, such captured images are used by the depth generation engine 102 to output one or more depth maps. In some examples, the depth generation engine 102, operating in accordance with techniques described herein, generates a depth map for images captured at a maximum distance of about 50 meters away from the scene 206.

Figure 3:
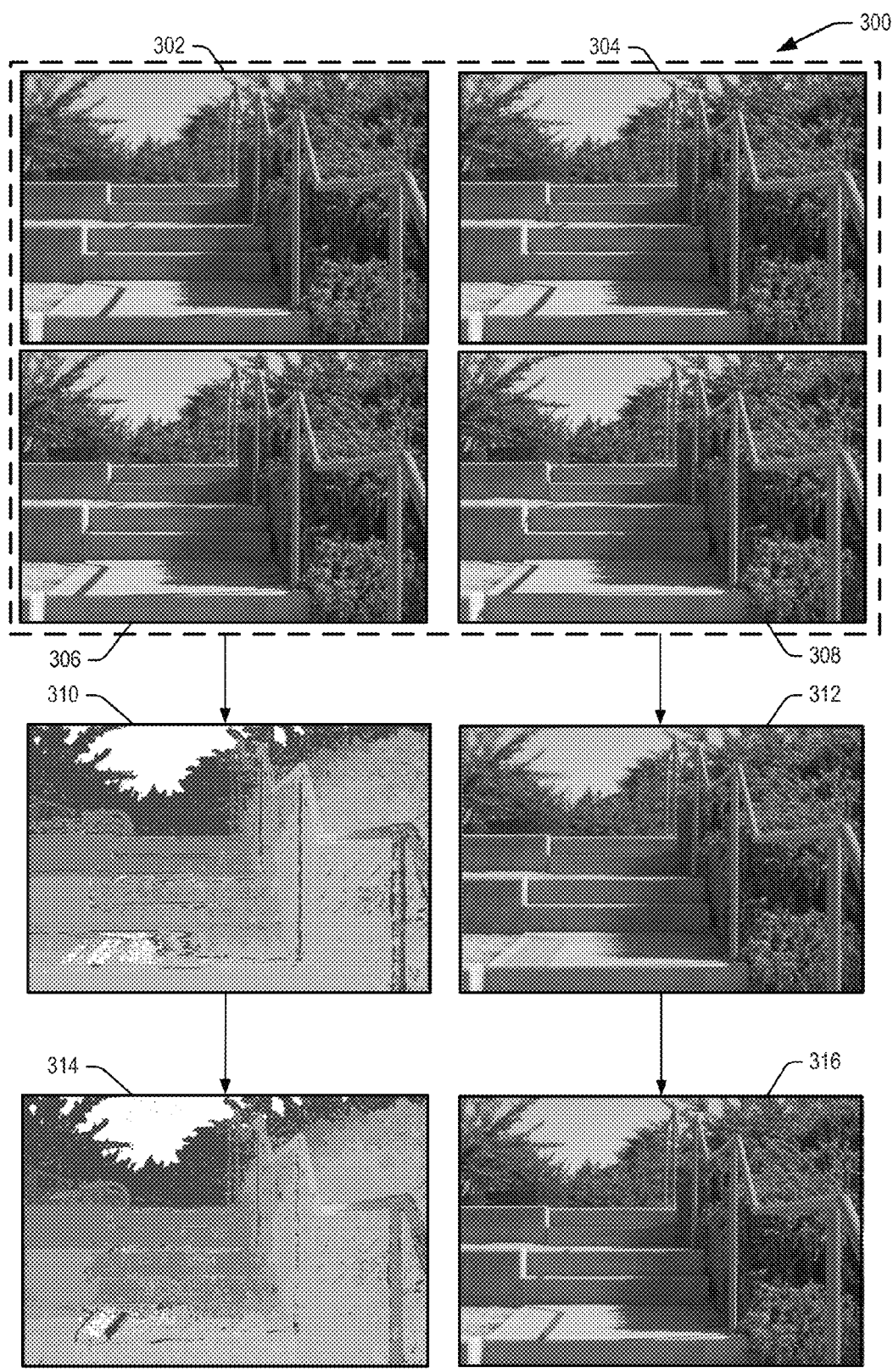
FIG. 3 is a diagram depicting an example implementation of certain techniques relating to estimating depth within digital images according to at least one embodiment.

FIG. 3 shows an example of a set of input images 302-308 and depth maps 310, 314 and all-in-focus images 312, 316 produced by applying the techniques described herein for estimating depth within digital images. In some examples, the input images 302-308 have been previously captured with a digital camera in accordance with techniques described herein. Thus, in some examples, the input images 302-308 each differ from each other with respect to at least one of an aperture setting or a focus setting. In some examples, the aperture settings and focus settings of the input images 302-308 were optimally selected using a selection function. In other examples, however, the aperture settings and the focus settings of the input images 302-308 may have been arbitrarily or systematically selected by an operator of the digital camera. Because the input images 302-308 have been captured using different input settings, each will be blurred differently.

Once the input images 302-308 are received, a depth map 310 and an all-in-focus image 312 may be computed. In some examples, the depth likelihood is used with a deconvolution algorithm (e.g., Weiner deconvolution) to recover the all-in-focus image 312. For example, once the blur kernels for each image patch in all of the input images have been estimated by independently computing the maximum depth likelihood at each pixel, the maximum depth likelihood is used to compute the all-in-focus image 312.

In some examples, a standard Weiner deconvolution is used to determine how an all-in-focus patch would look for each depth hypothesis (not just the maximum depth likelihood). In this example, the measure of uncertainty for each patch in the depth estimation is considered when computing the all-in-focus image 312. This is because the number of potential versions of an output patch, D, correspond directly to the number of depth hypotheses, D. A weighted linear combination of the number of answers is used to get back the final answer for the all-in-focus image 312, where the weight for the patch is derived from a depth hypothesis dd is the probability that patch is at depth dd (i.e., the likelihood of depth dd after the likelihood values are normalized to sum to 1 over all depths).

Once the input images 302-308 are received, at least a portion of the following operations may also be performed to compute the depth map 310 and the all-in-focus image 312 For example, consider a local blurry image patch b of one of the input images 302-308 captured with focus settings f and F-numbers a of a digital camera. Assuming depth in the patch is approximately constant, the appearance of b depends on the depth d and scene texture, which can be represented by an all-in-focus image h (e.g., all-in-focus image 312) of a specific reference focus $f_0$. In accordance with the techniques described herein, an inference about d and h from a number of blurry patches b sharing the same all-in-focus image captured with different lens settings may be presented.

In some examples, a formation procedure on individual blurry patches out of the same all-in-focus image may include magnification, defocus blur, sampling, and noise. Regarding magnification, as focus changes, the same scene point may be projected at different positions on the sensor plane of the digital camera 204, corresponding to a global geometric scaling.

$$h_f(x,y) = h_{\downarrow m_f(d)}(x,y) = h(m_f(d)x, m_f(d)y) \tag{1}$$

corresponds to the downsampling due to refocusing and the scaling factor $$m_f(d, f) = \frac{m(d, f_0)}{m(d, f)} \tag{2}$$

Regarding defocus blur, due to the finite shape of aperture, the image of out-of-focus objects appear blurry, and the blur corresponds to convolution between the magnified all-in-focus image and a disc, whose radius is determined by depth, focus, and aperture.

$$\tilde{b}_{f,a} = h_f * k_{\sigma(d,f,a)}. \tag{3}$$

Regarding sampling, though the sensor irradiance is continuous, digital images sample intensity only at discrete locations. Accordingly, only specific frequencies in the image may have been sampled.

$$b_{f,a} = \hat{b}_{f,a} + \epsilon \tag{4}$$

Finally, regarding noise, the final image is a non-linear, noisy version of the clean, sampled image. Within the scope of this disclosure, at least some input images are linearized and image noise is modeled with a simple Gaussian model.

$$b_{f,a} = h_{\downarrow m_f(d)} * k_{\sigma(d,f,a)} \cdot \delta_\omega - \Sigma \tag{5}$$

In some examples, magnification, defocus blur, and sampling may have Fourier counterparts. For example, magnification, which may be a global geometric scaling operator, may correspond to a geometric scaling in the Fourier domain:

$$h_f = h_{\downarrow m_f} \Leftrightarrow H_f = H_{\downarrow m_f} \tag{6}$$

Image-domain convolution may be an equivalent to element-wise multiplication in Fourier domain, $$\mathcal{F}[\tilde{b}_{f,a}] = H_f K_{\sigma(d,f,a)} \tag{7}$$

Finally, image-domain element-wise multiplication may also be expressed as Fourier-domain convolution, $$\mathcal{F}[\hat{b}_{f,a}] = \mathcal{F}[\tilde{b}]_{f,a} * \mathcal{F}[S_w] = \sum_n (H(m_f(d)\xi + nw) \cdot K_{\sigma(d,f,a)}(\xi + nw)) \tag{8}$$

Therefore, Eq. (5) may be expressed in the Fourier domain as $$B_{f,a}(\xi) = \mathcal{F}[b_{f,a}](\xi) \tag{9}$$

$$= \sum_n (H(m_f(d)\xi + n\omega) \cdot K_{\sigma(d,f,a)}(\xi + n\omega)) + \mathcal{F}[\epsilon](\xi) \tag{10}$$

$$= H(m_f(d)\xi) \cdot K_{\sigma(d,f,a)}(\xi) + N(\xi) \tag{11}$$

where $N(\xi)$ accounts for not only image noise, but also high frequency content beyond the Nyqvist frequency.

In some examples, it may be convenient, while evaluating depth likelihood function, to rectify the blurry image by scaling to the magnifications at $f_0$, so that $$i_{f,a} = \{b * \kappa_{m_f(d)}\}\downarrow_{m_f d} \tag{12}$$

where $\kappa_{m_f(d)}$ is the antialiasing filter. Thus it holds approximately that $$i_{f,a} \approx h * \psi(d) + \epsilon \tag{13}$$

where $$\psi_{d,f,a} = (k_{\sigma(d,f,a)} * \kappa_{m_f(d)})\downarrow_{m_f(d)} \tag{14}$$

Accordingly in the Fourier domain $$I_{d,f,a}(\xi) \approx H(\epsilon) \cdot \Psi_{d,f,a}(\xi) + N(\xi) \tag{15}$$

Next, the likelihood $\mathcal{L}(d)$ of a depth hypothesis d given N corresponding rectified patches $\{i_n = i_{f_n, a_n}\}$ may be determined. Because lens settings for each pixel are known, a sequence of blur kernels $\{\psi_n(d) = \psi_{d,f_n,a_n}\}$ can be computed with each kernel accounting for not only defocus blur, but also phase change (if nearest neighborhood has been used) and antialiasing filter (if bilinear and or interpolation has been used) for rectification.

Equivalently, a cost function $\epsilon(d|\{i_n\})$ may be evaluated that satisfies $$\mathcal{L}(d|\{i_n\}) = \exp\left(-\frac{1}{2}\epsilon(d|\{i_n\})\right) \tag{16}$$

for local image patches. Then a greedy depth map label may be generated, by simply picking the depth hypothesis of the minimum cost for individual pixels.

$$d^* = \underset{d}{\operatorname{argmin}}\ \epsilon(d|\{i_n\}) \tag{17}$$

In some examples, the discrete cost function can also be used as data cost of Markov Random field to incorporate spatial smoothness prior. Other methods are subsequently discussed that may generate continuous-valued depth estimates, rather than depth labels, out of this cost matrix, and may incorporate spatial prior in the continuous domain.

In some examples, a Fourier domain depth estimation algorithm may be introduced. A flat prior on depth may be assumed $$Pr(d) = \text{const} \tag{18}$$

and thus the posterior of d is proportional to joint distribution between blurry images and the depth may be $$\mathcal{L}(d|\{i_n\}) = Pr(d|\{i_{f_n,a_n}\}) \propto Pr(\{i_{f_n,a_n}\}|d) \tag{19}$$

The joint probability among the all-in-focus image patch and depth can further be expressed as $$\mathcal{L}(d|\{i_n\}) \propto Pr(\{i_{f_n,a_n}\}|d) \propto \int_h Pr(\{i_{f_n,a_n}\}|h,d) Pr(h) dh \tag{20}$$

where $Pr(\{i_{f_n,a_n}\}|h,d)$ corresponds to an image noise model and $Pr(h)$ corresponds to an image prior. The all-in-focus image h may be factored out by marginalizing it out.

Under Gaussian noise model, $$N \sim \mathcal{N}(0,\eta^2) \tag{21}$$

and Gaussian image prior $$H \sim \mathcal{N}(0, s_\xi^2) \tag{22}$$

the negative log likelihood may then be derived in closed-form $$-\log \mathcal{L}(d|\{i_n\}) \propto \tag{23}$$

$$\frac{1}{2}\sum_\xi \left(-\frac{1}{\eta^2} \frac{\left\|\sum_n I_n(\xi)\Psi_n(\xi)\right\|^2}{\sum_n \|\Psi_n(\xi)\|^2 + \eta^2/s_\xi^2} + \log\left(\sum_\xi \|\Psi_n(\xi)\|^2 + \eta^2 s_\xi^2\right)\right)$$

The limit of $\mathcal{L}(d)$ as $s_\xi^2 \to \infty$ may further be computed so that image prior becomes a flat prior. Accordingly, the likelihood function may be expressed as $$\epsilon(d|\{i_n\}) = \lim_{s_\xi^2 \to \infty} -2\log\mathcal{L}(d) \tag{24}$$

$$= -\frac{1}{\eta^2}\sum_\xi \frac{\left\|\sum_n I_n(\xi)\Psi_n(\xi)\right\|^2}{\sum_n \|\Psi_n(\xi)\|^2} + \sum_\xi \log\left(\sum_n \|\Psi_n(\xi)\|^2\right)$$

In some examples, the implementation of Eq. 24 may be expensive because it extracts local patches for the entire image. Alternatively, Eq. 24 may be rewritten in the image domain to compute the cost function using image convolution.

One observation may be that $$\sum_n I_n(\xi)\Psi_n(\xi) = \mathcal{F}\left[\sum_n i_n * \psi_n\right](\xi) \tag{25}$$

because of convolution theorem and linearity of Fourier transform. In this manner, input images may be collected as a data stream and stored in a buffer.

$$v_1 = \sum_n i_n * \psi_n \tag{26}$$

$$v_2 = \sum_n \psi_n * \psi_n \tag{27}$$

$$v_3 = \sum_\xi \log\left(\sum_n \|\psi_n(\xi)\|^2\right) \tag{28}$$

Then $\epsilon(d)$ may be computed by $$\epsilon(d|\{i_n\}) = -\frac{1}{\eta^2}\sum_\xi \frac{\|\mathcal{F}[v_1](\xi)\|^2}{\mathcal{F}[v_2](\xi)} + v_3 \tag{29}$$

Alternatively, the all-in-focus image may be estimated by $$h^* = \text{deconvwnr}(v_1, v_2) \tag{30}$$

In some examples, the approximation in Eq. 13 may cause artifacts at weak texture regions because of simplification about the scaling operation as images of different magnifications are aligned. In some examples, magnification may be fixed when two images, each of different apertures taken at each focus setting, are constrained. This may be accomplished at least in part by first computing MAP estimation of blur kernel size $\sigma^*_n$ at each focus setting $f_n$ for a reference aperture setting and then fit robustly the measured blur kernel size as a function of focus setting to the calibrated lens model.

$$d^* = \arg\min_d \sum_n \frac{\gamma^2}{\left(\left\|C_n + \frac{D_n}{d+B_n}\right\| - \|\sigma^*_n\|\right)^2 + \gamma^2} \tag{31}$$

with $\gamma$ being the level of noise in $\{\sigma^*_n\}$.

If it is assumed that the images of the same focus settings are taken continuously, this method may also ensure dense matching between continuous frames because both motion and lighting change outdoors are typically continuous.

The depth map 310 has been generated to indicate relative depths using a sliding scale of colors (as illustrated in FIG. 3). For example, red represents closer depths and blue represents depths that are further away. In some examples, the depth map 310 may include absolute depths. Once the depth map 310 and the all-in-focus image 312 are computed, an adjusted depth map 314 and an adjusted all-in-focus image 316 may be generated. In some examples, the adjusted depth map 314 and the adjusted all-in-focus image 316 are computed directly from the input images 302-308 using the depth likelihood function. In some examples, the adjusted depth map 314 and the adjusted all-in-focus image 316 are adjusted to account for movement of objects within the scene as between the input images 302-308. For example, the bush to the right in the images may have moved between when the input images 302-308 were captured. In some examples, the movement of the objects are accounted for by the techniques discussed below.

In one example, the likelihood function in Eq. 24 may be rewritten to consider pairs of images at a time as:

$$\varepsilon(d \mid \{i_n\}) \propto \frac{1}{\eta^2} \sum_\xi \frac{\sum_{m,n} \|I_m(\xi)\Psi_n(\xi) - I_n(\xi)\Psi_m(\xi)\|^2}{\sum_n \|\Psi_n(\xi)\|^2} + v_3(d) \tag{32}$$

$$= \frac{1}{\eta^2} \sum_{m,n} \sum_{s,t} [i_m * \phi_n - i_n * \phi_m](s,t)^2 + v_3(d) \tag{33}$$

$$\phi_m = \mathcal{F}^{-1}\left[\frac{K_m}{\sqrt{\sum_n \|K_n\|^2}}\right] \tag{34}$$

In some examples, the energy function that is derived may be different from Eq. 24 by a constant offset. Therefore, though they are not equal, they may constrain depth in a similar way as they may correspond to the same conditional likelihood and the same hypothetical depth of maximal likelihood.

Therefore, the calculation of the depth likelihood function may include computing difference between pairs of images with the defocus blur aligned $$j_{mn} = i_m * \phi_n \tag{35}$$

$$j_{nm} = i_n * \phi_m \tag{36}$$

or comparing their frequencies $$J_{mn} = I_m \Phi_n \tag{37}$$

$$J_{nm} = I_n \Phi_m \tag{38}$$

Based on this, the following techniques may be implemented to account for motion. When the motion is slight, it may be approximated as local translations. In this case, motion may not contribute much to the Fourier spectrum of $J_{mn}$, but mainly to its phase. Therefore, a simple way to achieve robustness to motion is to ignore the phase $$\varepsilon(d \mid \{i_n\}) \propto \frac{1}{\eta^2} \sum_\xi \sum_{m,n} (\|J_{mn}(\xi)\| - \|J_{nm}(\xi)\|)^2 + v_3 \tag{39}$$

To handle larger motions or make best use of the phase information, the defocus-aligned images $j_{mn}$ and $j_{nm}$ may be matched up to a shift. In some examples, a simple strategy may be to simply run optical flow to estimate the relative motion from the first image, which may be used as reference, to any other input images. After, the input images may be warped to align the input images and use them as input to the aforementioned depth estimation algorithm.

Finally, it may be possible to detect outliers in the scene (where scene change is too significant for optical flow or linear lighting model) by simply examining the minimal achievable cost function mind $\varepsilon(d)$ and threshold areas of large cost as outliers.

In some examples, the adjusted depth map 314 and the adjusted all-in-focus image 316 are adjusted to account for lighting conditions within the scene. For example, a shadow of the handrail on the steps in the input image 302 is much different from the shadow in input image 308. In some examples, changing lighting conditions of the objects are accounted for by the techniques discussed below.

For example, the illumination change may be modeled as a locally constant contrast change and brightness offset $$h_n = p_n h + q_n \tag{40}$$

Accordingly, it may be that $$j_{mn} = p_{mn} j_{nm} + q_{mn}, \text{ with} \tag{41}$$

$$p_{mn} = \frac{p_m}{p_n} \tag{42}$$

$$q_{mn} = q_m - p_{mn} q_n \tag{43}$$

Thus the likelihood function may be modified as $$\varepsilon(d \mid \{i_n\}) \propto \frac{1}{\eta^2} \sum_{m,n} \min_{p_{mn}, q_{mn}} \sum_{s,t} [p_{mn} j_{nm} + q_{mn} - j_{mn}](s,t)^2 + v_3 = \tag{44}$$

$$\frac{1}{\eta^2} \sum_{m,n} \left\{ \sum_{s,t} (j_{mn}(s,t) - \bar{j}_{mn})^2 - \frac{\left\|\sum_{s,t} (j_{mn}(s,t) - \bar{j}_{mn})(j_{nm}(s,t) - \bar{j}_{nm})\right\|^2}{\sum_{s,t} (j_{nm}(s,t) - \bar{j}_{nm})^2} \right\} + v_3$$

where $\bar{J}_{mn}$ is the mean value of $j_{mn}(s, t)$.

In some examples, lighting change robustness may be incorporated in the Fourier domain formulation. In this example, the offset may only affect the DC component and the error function may be computed by comparing $J_m(\xi)$ and $J_n(\xi)$ across $\xi$ up to a scale. Adjusting for lighting changes may therefore include adjusting the bias and gain of portions of at least some of the image patches.

Figure 4:
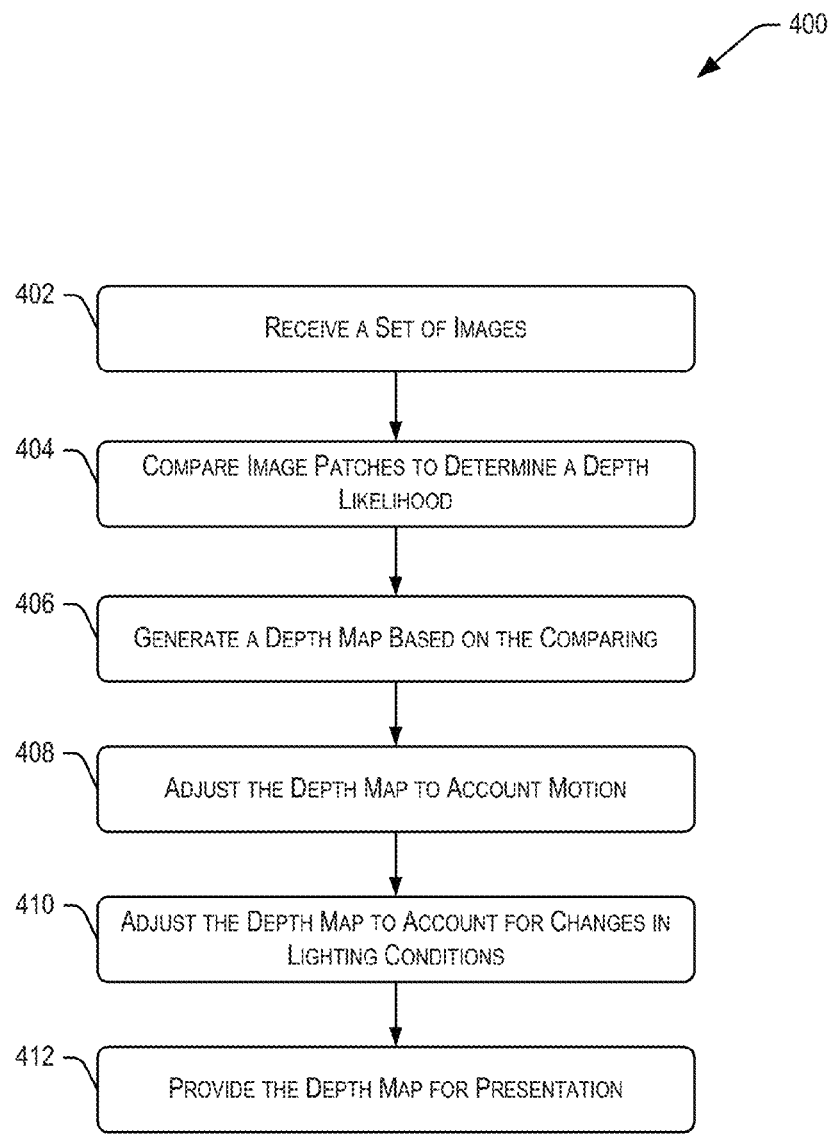
FIG. 4 is a flow chart depicting an example of a method for implementing techniques relating to estimating depth within digital images according to at least one embodiment.

The following discussion describes example acts and/or procedures that are performed using techniques described herein, in accordance with at least one example. FIG. 4 depicts process 400 including example acts or techniques relating to estimating depth within digital images in accordance with at least one example. Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The depth generation engine 102 (FIG. 1) using the depth likelihood function described herein performs the process 400 of FIG. 4. The process 400 begins at block 402 by receiving a set of images. In some examples, receiving the set of images includes receiving a set of images depicting a scene and captured from a substantially similar viewpoint. In some examples, images of the set of images have been captured by a digital camera using different configuration settings comprising aperture settings and focus settings. The configuration setting used to capture each image in the set of images is stored in metadata associated with the images. The images may be captured in accordance with settings generated and provided to the digital camera. In this example, the device which generated the instructions records which settings were provided and when generating the depth map (later) accesses these settings. In some examples, user input is received which indicates that the images were captured from the viewpoint. Occasionally, some of the images of the set are captured at slightly different locations from other images because the digital camera moved slightly while capturing the images. When this happens the differences between the images that are attributable to being captured at the different locations may be modeled similarly as differences that are attributable to motion are modeled. Thus, an optical flow or other adjustment technique may be performed to account for the differences between the images. The optical flow or other adjustment technique are able to account for minor variations between the two images.

At 404, the process 400 compares image patches from a first image of the set of images blurred with particular blur kernels with image patches from a second image of the set of images blurred with particular blur kernels to determine a depth estimate for each of the images patches. In some examples, comparing image patches includes comparing image patches in a way that avoids inappropriate bias towards selecting blur kernels with larger blur levels; especially, in the presence of noise. In some examples, comparing images patches to determine depth estimates includes evaluating the corresponding images patches over a discrete set of depth hypotheses and selecting the estimated depth for the image patches to be the depth hypothesis that yields the maximal depth likelihood. The process of 404 is described in more detail in FIG. 5.

At 406, the process 400 uses the calculated depth estimate(s) to generate a depth map. In some examples, generating the depth map includes generating a depth map that includes depth information that corresponds to distances of objects within a scene from the substantially similar viewpoint where the images were captured. The depth map is generated by taking a depth estimate for each image patch of an image as determined at 404. In some examples, generating a depth map includes extracting local patches for the entirety of captured images and comparing the local patches from different ones of the captured images without considering certain assumptions about the all-in-focus image. In some examples, generating the depth map may include extracting less than all of the local patches for the entirety of the captured images.

At 408, the process 400 adjusts the depth map to account for motion of an object between images of a scene. In some examples, adjusting the depth map to account for motion of the object includes using an optical flow technique or by transforming to the Fourier domain by representing image patches of the images of the set of images as a set of frequencies and phases and comparing the magnitudes of the image patches, while ignoring the phases.

When multiple images are captured, especially outdoors, there may be slight positional differences between objects within the multiple images as a result of the objects moving. This may be a result of wind blowing the objects. For example, wind may cause the leaves of the tree 212 or the tops of the carrots 210 to move while the operator 202 captures the multiple images. Thus, in a first image the tops of the carrots 210 may be in a first position within the first image and may be in a second position within a second image. If these discrepancies are not accounted for either before or during depth map generation, they may affect the quality of a resulting depth map. Accordingly, at 408, one or more operations on portions of the images are performed in order to compensate for such movement. These operations include, for example, performing an optical flow technique to estimate the new location of pixels in a second image compared to a location of the pixels in a first image or by transforming patches of the images to the Fourier domain by representing them as a set of frequencies and phases and comparing the magnitudes of all patches, while ignoring the phases. This second method is useful because it may be insensitive to patch translation. In some examples, the depth likelihood function is adjusted in order to also account for motion. In some examples, motion is accounted for by a separate function performed after a depth map has been generated.

At 410, the process 400 adjusts the depth map to account for changes in lighting conditions between images of the scene. In some examples, adjusting the depth map to account for changes in lighting conditions includes modeling illumination changes as a local constant change in brightness and contrast. For example, when multiple images are captured, especially outdoors, there may be slight illumination changes in the intensity of colors in image patches, brightness of image patches, and the like within the multiple images as a result of lighting changes between when the multiple images were captured. This may be a result of a natural condition (e.g., the sun going behind a cloud between images) or an unnatural condition (e.g., a flash going off while capturing certain images and not going off while capturing other images). For example, the tree 212 may produce a certain shadow when the sun is to its right, but may produce a different shadow when the sun is to the left. Similarly, when the sun is out, there may be a more defined shadow compared to when the sun is behind a cloud. Methods for compensating for changes in lighting conditions include, for example, modeling illumination changes as a local constant change in brightness and contrast. Accounting for the lighting changes between a first patch in a first image and a second patch in a second image, include adjusting the bias and gain of the second image patch. In some examples, the depth likelihood function is adjusted in order to also account for lighting changes. In some examples, lighting changes are accounted for by a separate function performed after a depth map has been generated.

At 412, the process 400 provides the depth map for presentation. In some examples, providing the depth map for presentation includes providing the depth map for presentation on a user device.

Figure 5:
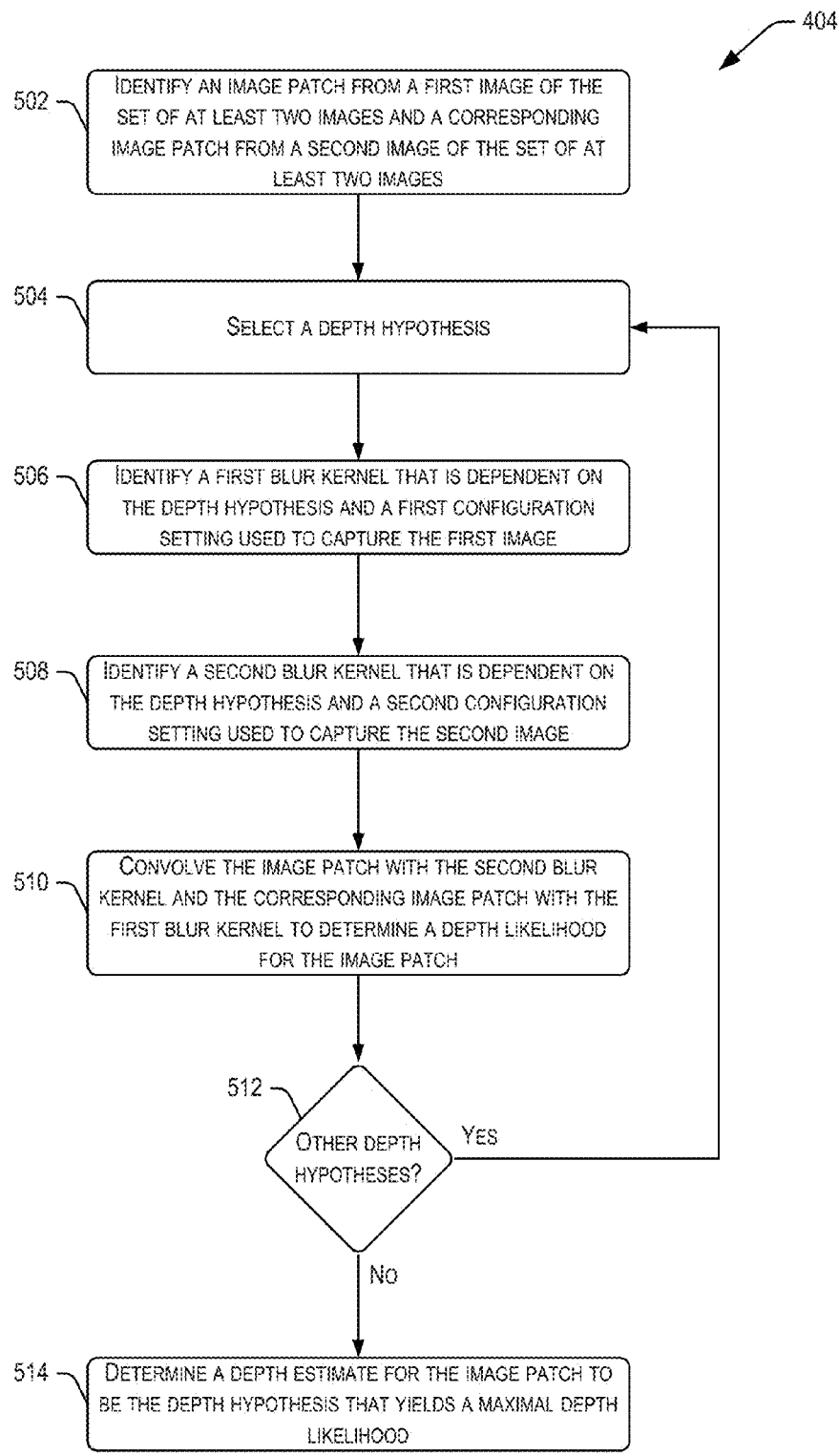
FIG. 5 is a flow chart depicting an example of a method for implementing techniques relating to estimating depth within digital images according to at least one embodiment.

FIG. 5 depicts an exemplary process 404 (FIG. 4) for estimating depth of an image patch. The process 500 begins at block 502 by identifying an image patch from a first image of the set of at least two images and corresponding image patches from a second image of the set of at least two images. In some examples, the identifying is performed by the computer system. At step 504, a first depth hypothesis from a discrete set of depth hypotheses. The discrete set of depth hypotheses may include any suitable number of depth hypotheses. In some examples, forty depth hypotheses are included in the discrete set.

At 506, a first blur kernel is identified that is dependent on the selected depth hypothesis and a first configuration setting used to capture the first image. As described herein, the first blur kernel is dependent on the selected depth hypothesis and the first configuration setting at least because during calibration of the digital camera blur kernels were mapped to depths and configuration settings (i.e., variations of aperture and focus settings). Similarly, at 508, a second blur kernel is identified that is dependent on the selected depth hypothesis and a second configuration setting used to capture the second image. As described herein, the second blur kernel is dependent on the depth hypothesis and the second configuration setting at least because during calibration of the digital camera blur kernels were mapped to configuration settings (i.e., variations of aperture and focus settings) and depth.

At 510, the image patch of the first image is convolved with the second blur kernel and the corresponding image patch from the second image is convolved with the first blur kernel to determine a depth likelihood for the image patch. The convolution may be normalized in some examples. After determining the depth likelihood produced by the selected depth hypothesis, the process determines at 512 whether there are other depth hypotheses to be evaluated. If so, the process returns to step 504 to select another depth hypothesis and is repeated from that point. Then it is finally determined at step 512 that no other depth hypotheses remain to be evaluated, the moves to set 514, where the depth hypothesis that yielded the maximal depth likelihood is determined to be the depth estimate for the image patch.

Figure 6:
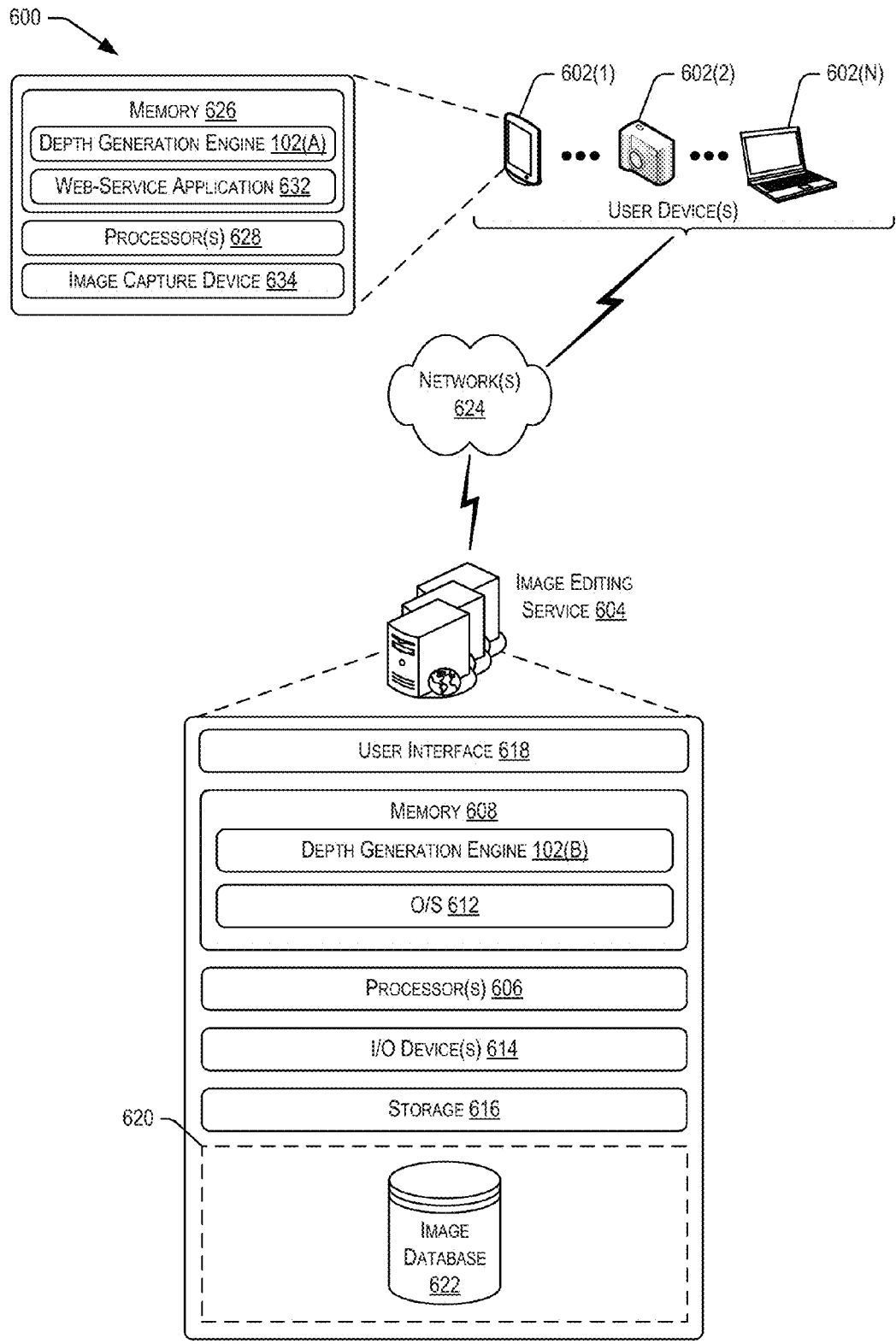
FIG. 6 is a diagram depicting an example network environment for implementing techniques relating to estimating depth within digital images according to at least one embodiment.

Turning next to FIG. 6, in which is illustrated example architecture 600 for implementing techniques relating to estimating depth within digital images as described herein. The architecture 600 includes one or more user devices 602(1)-602(N) (hereinafter, "the user device 602") in communication with an image editing service 604 via networks(s) 624 (hereinafter, "the network 624"). The network 624 includes any one or a combination of many different types of networks, such as cable networks, the Internet, wireless networks, cellular networks, radio networks, and other private and/or public networks.

The user device 602 includes any suitable device capable of capturing an image and/or performing one or more operations on images. In some examples, the user device 602 may be any suitable computing device such as, but not limited to, digital camera, a mobile phone, a smart phone, a personal digital assistant (PDA), a laptop computer, a personal computer, a desktop computer, a set-top box, a thin-client device, or other computing device. The user device 602 is utilized by one or more users (not shown) for interacting with the image editing service 604. Any uses of "digital camera" throughout this specification are for illustrative purposes only and a person of ordinary skill in the art would understand that any one of the user devices 602(1)- 602(N) or any similar device may be substituted.

The user device 602 therefore includes a processor 628 communicatively coupled to a memory 626 and that executes computer-executable program code and/or accesses information stored in the memory 626. In some examples, the memory 626 stores a depth generation engine 102(A) and a web-service application 632. The processor 628 may include a microprocessor, an application-specific integrated circuit ("ASIC"), a state machine, or other processing device. The processor 628 also includes any of a number of processing devices, including one. Such a processor can include or may be in communication with a computer-readable medium storing instructions that, when executed by the processor 628, cause the processor to perform the operations described herein. The web-service application 632 enables the user to interact with the image editing service 604 over the network 624. The user device 602 also includes an image capture device 634. In some examples, the image capture device 634 may be configured to capture one or more images. In some examples, the image capture device 634 may include a conventional digital camera including a lens, aperture setting, focus setting, an infrared projector, or a structured light device.

The image editing service 604 may be a web-based service accessible via the network 624 by the user device 602 and other devices. For example, suppose a plurality of images were captured using the user device 602(2) (e.g., a digital camera), these images may be transferred to the user device 602(N) (e.g., a computer), and the user device 602(N) may communicate with the image editing service 604, executing the depth generation engine 102(B), to generate a depth map from the images. In this manner, the image editing service 604 may be configured to generally implement the techniques described herein. In some examples, the image editing service 604 is implemented by one or more web servers and the image editing service 604 may be accessed by the user device 602 via the network 624, which may be the Internet, an intranet, extranet or any other data and/or communication network.

The image editing service 604 includes a processor 606 that is communicatively coupled to a memory 608 and that executes computer-executable program code and/or accesses information stored in the memory 608. In some examples, the memory 608 stores a depth generation engine 102(B) and an operating system 612. The operating system 612 may be any suitable operating system configured for interacting with the image editing service 604. The processor 606 may include a microprocessor, an ASIC, a state machine, or other processing device. The processor 606 may also include any of a number of processing devices, including one. Such a processor can include or may be in communication with a computer-readable medium storing instructions that, when executed by the processor 606, cause the processor to perform the operations described herein.

The memory 608 may include any suitable computer-readable medium. The computer-readable medium may include any electronic, optical, magnetic, or other storage device capable of providing a processor with computer-readable instructions or other program code. A computer-readable medium may include, for example, a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The image editing service 604 also includes a number of external or internal devices such as input or output devices. For example, the image editing service 604 includes input/output (I/O) device(s) and/or ports 614, such as for enabling connection with a keyboard, a mouse, a pen, a voice input device, a touch input device, a display, speakers, a printer, or other I/O device. The image editing service 604 also includes additional storage 616, which may include removable storage and/or non-removable storage. The additional storage 616 may include, but is not limited to, magnetic storage, optical disks, and/or tape storage. The disk drives and their associated computer-readable media may provide non-volatile storage of computer-readable instructions, data structures, program modules, and other data. The image editing service 604 may also include a user interface 618. The user interface 618 may be utilized by an operator, or other authorized user to access portions of the image editing service 604. In some examples, the user interface 618 may include a graphical user interface, web-based applications, programmatic interfaces such as application programming interfaces (APIs), or other user interface configurations. The image editing service 604 also includes data store 620. The data store 620 may include data structures for storing information related to the implementation of the techniques described herein. Such information may be stored in image database 622. Within the image database 622 may be stored input images, depth maps, and other similar images, and maps, together with their associated information.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A computer-implemented method comprising:
   receiving, by a computer system, a first image and a second image that both depict a scene;
   identifying, by the computer system, first image patches from the first image and second image patches from the second image;
   iteratively evaluating, by the computer system, each of the first image patches over multiple depth hypotheses, wherein the iterative evaluation comprises, for each depth hypothesis and each of the first image patches:
      identifying a first blur kernel that is dependent on the depth hypothesis and a first configuration setting used to capture the first image,
      identifying a second blur kernel that is dependent on the depth hypothesis and a second configuration setting used to capture the second image, and
      determining a depth likelihood for the depth hypotheses based on convolving the image patch with the second blur kernel and convolving a respective one of the second image patches with the first blur kernel;
   determining, for each of the first image patches, a depth estimate for the image patch based on one of the depth hypotheses for which the iterative evaluation generates a maximal depth likelihood; and
   generating, by the computer system, a depth map using the depth estimate for each image patch.

2. The computer-implemented method of claim 1, further comprising determining, from calibration data for a digital camera that captured the first image and the second image, a mapping from blur kernels to depths and configuration settings, wherein the first blur kernel and the second blur kernel are each identified from the mapping.

3. The computer-implemented method of claim 1, further comprising:
identifying, by the computer system, a change in position of an object between the first image and the second image and within the scene depicted in the first image and the second image; and
adjusting at least one of the first image or the second image to account for the identified change.

4. The computer-implemented method of claim 3, wherein accounting for the identified change comprises, during the iterative evaluation:
representing the image patch and the respective one of the second image patches in the frequency domain;
computing the total power of each of the image patch and the respective one of the second image patches at a set of spatial frequencies; and
penalizing differences in power over the set of spatial frequencies.

5. The computer-implemented method of claim 1, wherein the iterative evaluation further comprises modeling changes in brightness or contrast in at least one of the first image or the second image.

6. The computer-implemented method of claim 1, wherein the iterative evaluation further comprises applying a normalization technique to avoid bias toward blur kernels with larger blur levels.

7. The computer-implemented method of claim 1, wherein the iterative evaluation further comprises determining a measure of uncertainty for each image patch, wherein the measure of uncertainty indicates an amount of variance in the depth likelihood for a given depth hypothesis.

8. The computer-implemented method of claim 1, wherein at least one of the first configuration setting or the second configuration setting comprises at least one of an aperture setting or a focus setting.

9. The computer-implemented method of claim 1, wherein the first image and the second image are captured without regard to a sampling pattern and at least one of the first configuration setting or the second configuration setting is selected arbitrarily.

10. A computer system comprising:
a processing device; and
a non-transitory computer-readable medium communicatively coupled to the processing device,
wherein the processing device is configured for executing instructions stored in the non-transitory computer-readable medium and thereby performing operations comprising:
receiving a first image and a second image that both depict a scene;
identifying first image patches from the first image and second image patches from the second image;
iteratively evaluating each of the first image patches over multiple depth hypotheses, wherein the iterative evaluation comprises, for each depth hypothesis and each of the first image patches:
identifying a first blur kernel that is dependent on the depth hypothesis and a first configuration setting used to capture the first image,
identifying a second blur kernel that is dependent on the depth hypothesis and a second configuration setting used to capture the second image, and
determining a depth likelihood for the depth hypotheses based on convolving the image patch with the second blur kernel and convolving a respective one of the second image patches with the first blur kernel;
determining, for each of the first image patches, a depth estimate for the image patch based on one of the depth hypotheses for which the iterative evaluation generates a maximal depth likelihood; and
generating a depth map using the depth estimate for each image patch.

11. The computer system of claim 10, wherein the operations further comprise determining, from calibration data for a digital camera that captured the first image and the second image, a mapping from blur kernels to depths and configuration settings, wherein the processing device is configured for identifying the first blur kernel and the second blur kernel from the mapping.

12. The computer system of claim 10, wherein the operations further comprise:
identifying a change in position of an object between the first image and the second image and within the scene depicted in the first image and the second image; and
adjusting at least one of the first image or the second image to account for the identified change.

13. The computer system of claim 12, wherein accounting for the identified change comprises, during the iterative evaluation:
representing the image patch and the respective one of the second image patches in the frequency domain;
computing the total power of each of the image patch and the respective one of the second image patches at a set of spatial frequencies; and
penalizing differences in power over the set of spatial frequencies.

14. The computer system of claim 10, wherein the iterative evaluation further comprises modeling changes in brightness or contrast in at least one of the first image or the second image.

15. The computer system of claim 10, wherein the iterative evaluation further comprises applying a normalization technique to avoid bias toward blur kernels with larger blur levels.

16. The computer system of claim 10, wherein the iterative evaluation further comprises determining a measure of uncertainty for each image patch, wherein the measure of uncertainty indicates an amount of variance in the depth likelihood for a given depth hypothesis.

17. The computer system of claim 10, wherein at least one of the first configuration setting or the second configuration setting comprises at least one of an aperture setting or a focus setting.

18. A non-transitory computer-readable medium storing computer-executable instructions, the instructions comprising:
instructions for receiving a first image and a second image that both depict a scene;
instructions for identifying first image patches from the first image and second image patches from the second image;
instructions for iteratively evaluating each of the first image patches over multiple depth hypotheses, wherein the iterative evaluation comprises, for each depth hypothesis and each of the first image patches:
identifying a first blur kernel that is dependent on the depth hypothesis and a first configuration setting used to capture the first image, identifying a second blur kernel that is dependent on the depth hypothesis and a second configuration setting used to capture the second image, and determining a depth likelihood for the depth hypotheses based on convolving the image patch with the second blur kernel and convolving a respective one of the second image patches with the first blur kernel;

instructions for determining, for each of the first image patches, a depth estimate for the image patch based on one of the depth hypotheses for which the iterative evaluation generates a maximal depth likelihood; and instructions for generating a depth map using the depth estimate for each image patch.

19. The non-transitory computer-readable medium of claim 18, wherein the instructions further comprise instructions for determining, from calibration data for a digital camera that captured the first image and the second image, a mapping from blur kernels to depths and configuration settings, wherein the first blur kernel and the second blur kernel are each identified from the mapping.

20. The non-transitory computer-readable medium of claim 18, wherein the instructions further comprise instructions for performing operations prior to identifying the first image patches and the second image patches, the operations comprising:

identifying, by the computer system, a change in position of an object between the first image and the second image and within the scene depicted in the first image and the second image; and adjusting at least one of the first image or the second image to account for the identified change.

* * * * *